Dec. 1, 1964

C. W. ZIES 3,159,457

SOLVENT EXTRACTOR AND SOLVENT EXTRACTION

Filed Oct. 13, 1960

INVENTOR.
CARL W. ZIES
BY
Meyer, Baldwin, Doran & Young
ATTORNEYS

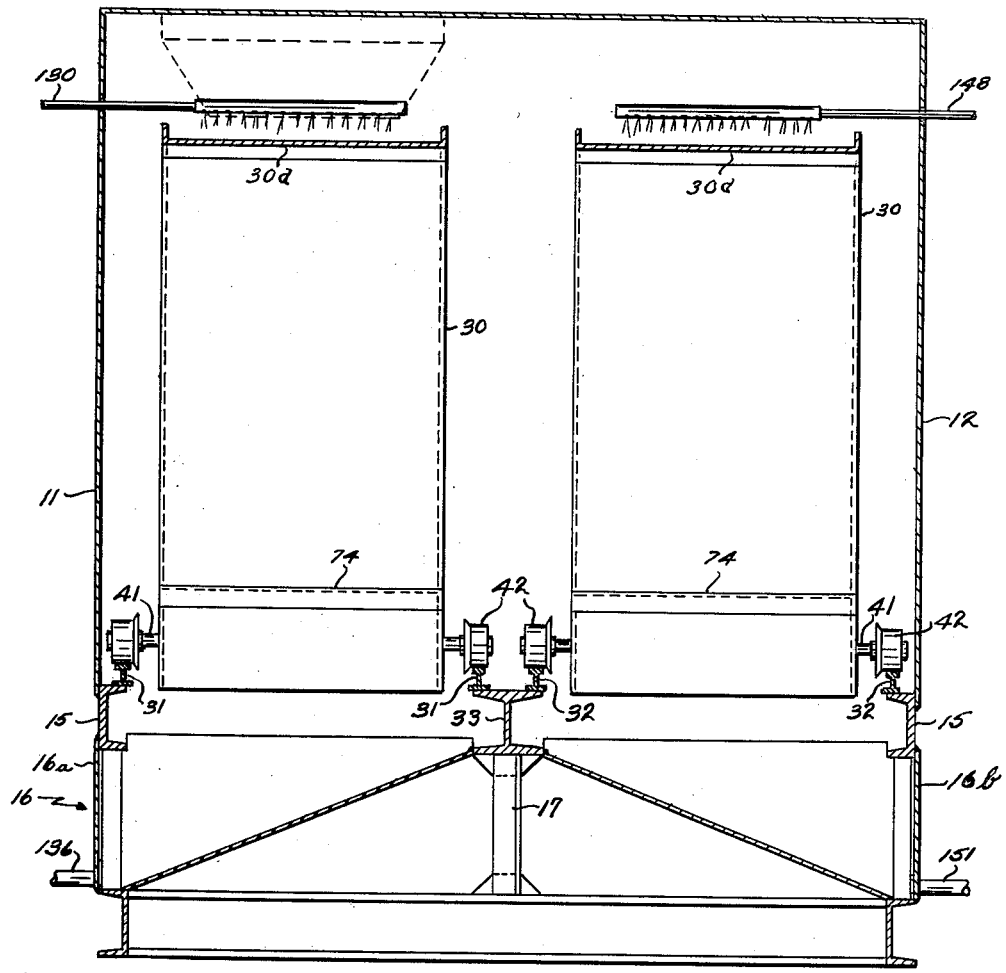

Dec. 1, 1964

C. W. ZIES 3,159,457

SOLVENT EXTRACTOR AND SOLVENT EXTRACTION

Filed Oct. 13, 1960

INVENTOR.
CARL W. ZIES
BY
Myer, Baldwin, Doran & Young
ATTORNEYS

Dec. 1, 1964 C. W. ZIES 3,159,457
SOLVENT EXTRACTOR AND SOLVENT EXTRACTION
Filed Oct. 13, 1960 7 Sheets-Sheet 4

INVENTOR.
CARL W. ZIES
BY
Meyer, Baldwin, Doran & Young
ATTORNEYS

Dec. 1, 1964   C. W. ZIES   3,159,457
SOLVENT EXTRACTOR AND SOLVENT EXTRACTION
Filed Oct. 13, 1960   7 Sheets-Sheet 6

INVENTOR.
CARL W. ZIES
BY
Meyer, Baldwin, Doran & Young
ATTORNEYS

Dec. 1, 1964 C. W. ZIES 3,159,457
SOLVENT EXTRACTOR AND SOLVENT EXTRACTION
Filed Oct. 13, 1960 7 Sheets-Sheet 7

INVENTOR.
CARL W. ZIES
BY
Meyer, Baldwin, Doran & Young
ATTORNEYS

.# United States Patent Office 3,159,457
Patented Dec. 1, 1964

3,159,457
SOLVENT EXTRACTOR AND SOLVENT
EXTRACTION
Carl W. Zies, Lakewood, Ohio, assignor to International
Basic Economy Corporation, New York, N.Y., a corporation of New York
Filed Oct. 13, 1960, Ser. No. 62,368
1 Claim. (Cl. 23—270)

The invention relates to a novel method, and to apparatus for practicing the said method, for use in extracting soluble components from solid organic and/or inorganic materials, as for example oils from oil bearing seeds and the like.

The invention more particularly relates to a novel method, and to apparatus for practicing the said method, for use in extracting soluble components from solid materials, and wherein the extraction apparatus carries distinct batches of the solid material through a linear path throughout the extraction cycle. In the preferred method and embodiment of apparatus, as will be hereinafter disclosed the solid material is intermittently moved through said linear path during which time the extraction of the soluble components is thus accomplished.

The extraction of soluble components from solid materials by use of liquid solvents consists basically of subjecting the solid material to the leaching action of a solvent for a predetermined time period during which interval the soluble components in said material are dissolved in said solvent and thus removed.

Heretofore, various extraction methods and apparatus for accomplishing said methods have been utilized in the related art, but as is well known to the artisan, each of said methods and/or apparatus is inherently deficient in several respects whereby its utilitarian value is thus limited.

By way of example, solvent extraction equipment of the continuous type in use at present may be divided into five general types or classes, namely: the vertical basket extractor; horizontal basket extractor; belt extractor; total submergence extractor; and the circular extractor.

As is known to the artisan, in the vertical basket extractor a plurality of baskets are suspended on an endless link chain, said baskets carrying the solid material and lowered by said chain substantially vertically during the first half of the extraction cycle, during which interval solvent is applied to said material to thus extract the oil therefrom. During the latter part of the cycle the baskets are successively raised and returned to the initial starting point.

Oftentimes the endless link chain breaks and the baskets being suspended thereon fall onto the underlying extractor apparatus whereby the same is damaged.

The horizontal basket extractor offers an improvement over the vertical basket extractor in that the baskets are usually mounted on a chain conveyor or the like which carries said baskets initially in a horizontal path, then arcuately to a lower horizontal path whereby said baskets are carried in the opposite direction and then arcuately raised and returned to their initial position. During the interval, while each basket is subscribing the second arcuate path, it is literally turned over so as to empty the extracted material from the same. This mechanism, as will be recognized, while subject to chain conveyor breakage as in the vertical basket extractor likewise makes it impossible to utilize a maximum depth of basket relative to the cross-sectional area of the basket so as to permit maximum extraction efficiency for said apparatus.

The primary disadvantages in the belt type of extractor or the drag chain type, which also falls in this category, is that in the case of extractor failure, whereby the belt which carries the solid material stops, there is no means by which the material may be emptied from said belt except by literally shoveling the same from said belt. This, of course, is extremely hazardous when flammable solvents are utilized to extract the oil from said material.

The total submergence extractor, as above referred to, is the most efficient unit of all the hitherto available extractor assemblies with respect to extraction efficiency. In this system the solid material is totally submerged in the solvent. However, because of total submergence, materials which are reduced to a fine particle size, or which initially are of a fine particle size, tend to float within said solvent. As a consequence, a separation of these fines from the miscella requires additional filtration apparatus.

In the circular extractor, which is one of the recent developments within the solvent extractor field, the baskets are interconnected one to the other and continuously carry the solid material through a circular path during the extraction cycle. When this type of extractor is built into any appreciable size its individual component parts must first be shipped to the site of construction before the same can be assembled. In many instances the completed assembly likewise becomes prohibitively large. Consequently, this type of extractor usually has certain limitations merely because of its physical size.

It is therefore an object of this invention to provide a novel and improved solvent extraction method for use in extracting soluble components from solid materials bearing said components, and wherein said method includes moving separate batches of the solid material through a closed linear extraction path during which interval solvent is applied to said material so as to remove the soluble material therefrom.

Another object of the present invention is to provide a novel and improved solvent extraction method for use in extracting soluble components from solid organic materials, and wherein said method includes moving separate batches of the solid material intermittently through a closed linear extraction path during which interval solvent is repeatedly applied to said material so as to remove the aforesaid soluble components from the same.

Still another object of the present invention is the provision of a new and novel method of solvent extraction and to apparatus for practicing said method for use in extracting soluble components from solid materials, and wherein said apparatus includes means for separately carrying discrete batches of the solid material through a closed linear path, and means for supplying solvent to said material during said interval whereby the soluble material is dissolved in said solvent and thus removed from said material.

Another object of the present invention is the provision of new and novel extraction apparatus for use in extracting soluble components from solid organic materials, and wherein said apparatus includes means defining a linear conveyance path, means for separately carrying discrete batches of the solid material intermittently through said path while solvent is applied to said material, the solvent being effective to dissolve the soluble components and remove the latter from said material, said linear conveyance path being closed upon itself to thereby provide for a continuous extraction of soluble components from successive batches of said material.

Another object of the present invention is the provision of new and improved extraction apparatus especially designed for use in extracting soluble components from solid organic materials, which apparatus includes a housing defining a linear extraction path, a plurality of baskets disposed in said housing each being adapted to carry a discrete batch of the solid material through said path, means for separately moving each of said baskets along said path while solvent is applied to said material to dissolve the soluble components and remove the latter from said material, said linear extraction path being closed upon itself to thereby provide for repetitive extraction cycles to be accomplished by said apparatus.

Another object of this invention is to provide novel extraction apparatus as is above defined and wherein the baskets in said apparatus have a linear rectangular path and also an intermittent movement along said path.

Another object of this invention is to provided for solvent extraction as above referred to and wherein the baskets carrying the solid material are free to be separately and individually moved along the linear extraction path.

Still another object of this invention is to provide extraction apparatus as above defined, and wherein uniform loading of the baskets is accomplished to thus permit the even extraction of a greater range of sizes of solid materials.

A further object of this invention is to provide extraction apparatus which can extract soluble components from relatively finely divided particles as well as from coarse particles, the latter being characterized in the art by what is known as "lightly pressed screw press cake."

Another object of this invention is to provide a new and improved basket extraction apparatus as above defined, and wherein loading each of the baskets of said apparatus is more uniform, so that the miscella circulation through said baskets is substantially more uniform.

Still another object of the present invention is to provide a new and improved basket extraction apparatus as is above defined, and wherein the said apparatus is of such construction as to permit its being capable of pre-fabrication and mechanical operational testing prior to shipment to its intended work location, and further wherein said construction is such as to permit said apparatus to be shipped as an integral unit.

Other objects and advantages of the new and improved solvent extraction method and apparatus for practicing said method will be apparent to one skilled in the art to which it pertains, particularly after study of the following disclosure of a preferred embodiment of the invention which is illustrated in the accompanying drawings wherein:

FIG. 2 is a sectional view taken approximately on the plane indicated by the line 2—2 in FIG. 1;

FIG. 3 is a longitudinal fragmentary view taken approximately on the plane indicated by the line 3—3 in FIG. 1 with the housing of the apparatus removed to more clearly show the interior assembly of said apparatus;

The novel solvent extraction method of the present invention comprises basically intermittently conveying separate batches of solvent-extractable solid material along a closed linear extraction path during which interval a suitable solvent is preferably repeatedly applied to said material at predetermined positions spaced along said path, said solvent as will be understood, thus thoroughly intermingling with the soluble components in said solid material so as to substantially dissolve the same therein, said solution thus providing a resultant predetermined concentration of miscella which may thereafter be drained from said material so that said soluble components may be subsequently separated from said solvent in a conventional manner well known in the art.

*Mechanical Assembly*

Figure 1:
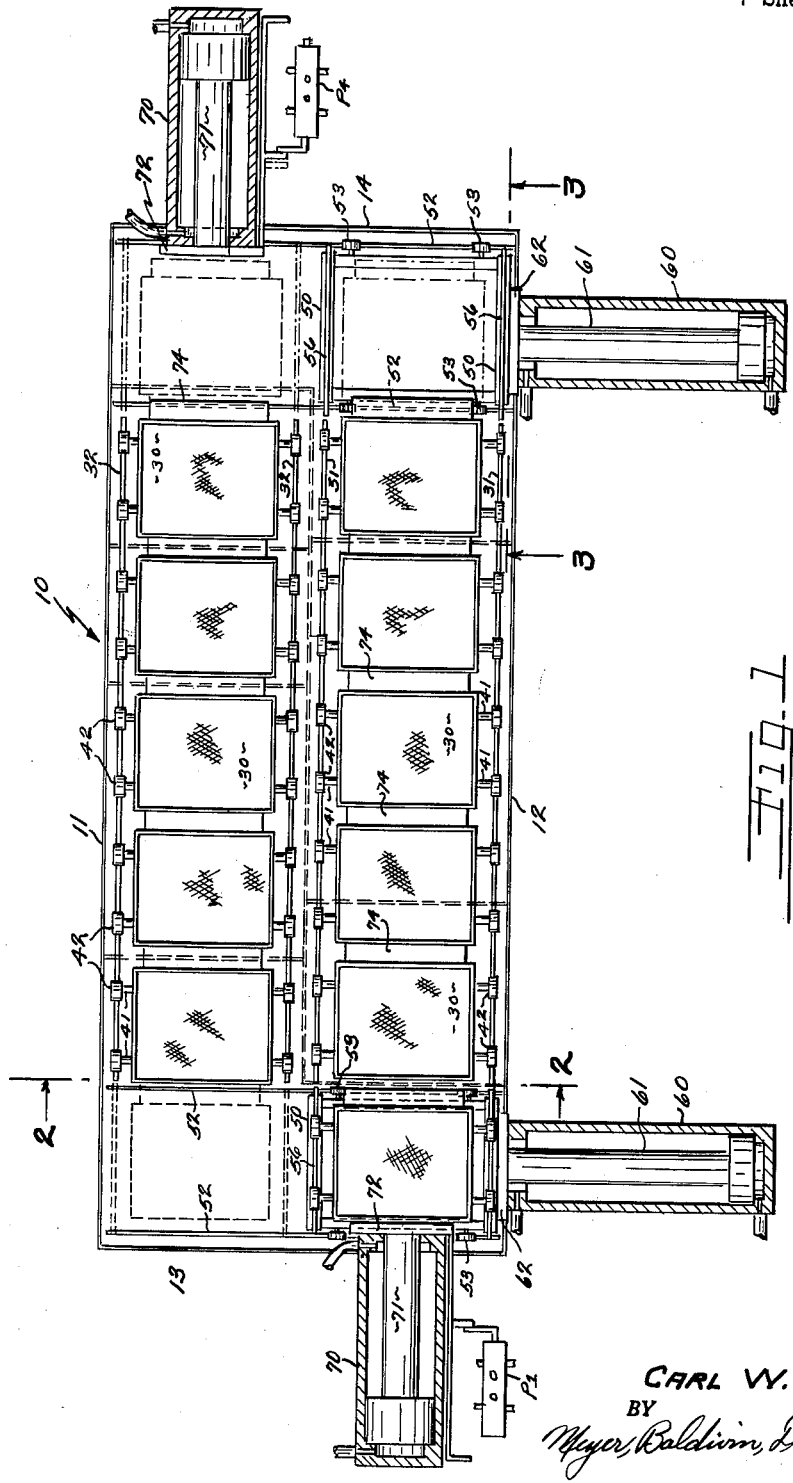
FIG. 1 is a plan view of basket extractor apparatus embodying the concepts of the present invention.

A preferred assembly of extractor apparatus embodying the concepts of the present invention and which is especially designed to accomplish the aforesaid extraction method is herein shown with particular reference directed to FIG. 1, wherein said apparatus is seen to include a substantially rectangular housing identified in its entirety by the reference numeral 10, and which comprises side walls 11 and 12 connected at oposite ends to end walls 13 and 14. A channel 15, FIG. 2, is rigidly attached to the bottom edge of each side wall 11 and 12 of housing, extending longitudinally therealong, and supports a depending drainage tank 16 therebelow, said channels 15 being rigidly attached by any suitable means to the opposed side walls 16a and 16b of said tank.

Figure 6:
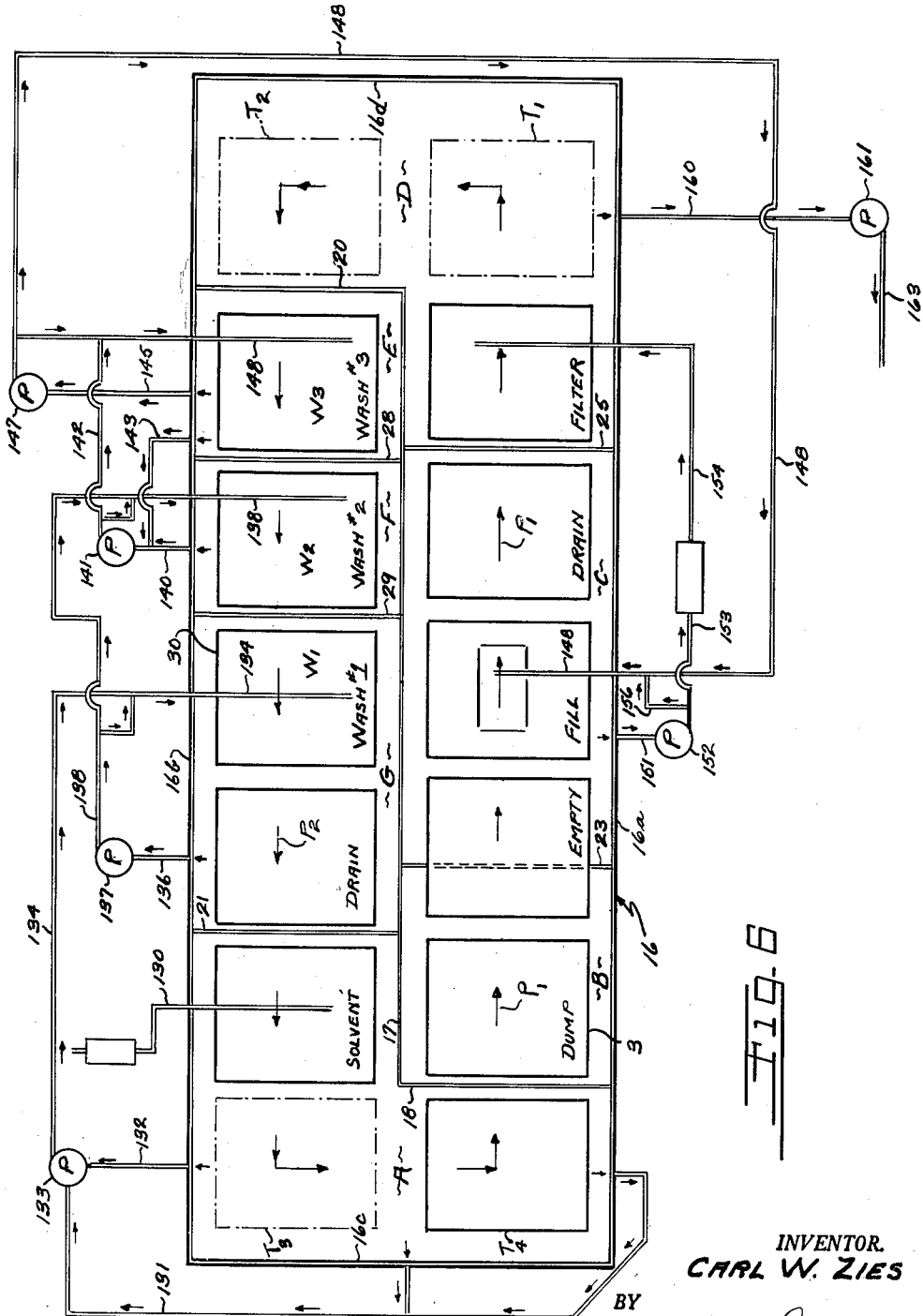
FIG. 6 is a diagrammatic illustration of the circuit for supplying the solvent to the basket extracting apparatus, the latter being somewhat schematically illustrated at show the several positions in said apparatus at which said solvent may be supplied and/or drained.

The drainage tank 16 as best seen in FIGS. 2 and 6 is provided with a central partition 17 which extends longitudinally centrally therethrough, the ends of which terminate inwardly of end walls 16c and 16d thereof, one end of said partition 17 adjacent the end wall 16c connecting with a transverse partition 18, the latter at its opposite end being attached to the inner surface of the side wall 16a. The opposite end of said central partition 17 connects with a transverse partition 20, the latter in like manner, being attached at its opposite end to the side wall 16b of said tank.

A partition 21 likewise extending transversely across the drainage tank 16 connects with the side wall 16b and the aforesaid central partition 17 to thus define a substantially right angle compartment in said tank identified in its entirety by the reference character A.

Partition 23 which also extends transversely across said tank and which is attached at its one end to the aforesaid side wall 16a and at its opposite end to the central partition 17, thus defines between the same and said partition 18, a compartment B disposed adjacent to the aforesaid compartment A.

Said drainage tank is likewise provided with a partition 25 extending substantially transversely across the same and connecting at its opposite ends to the side wall 16a and central partition 17 to define a third compartment in said tank identified by the reference character C which is located adjacent the aforesaid compartment B.

Said transverse partition 25, with the central partition 17 and connected partition 20 and interconnected portions of the side walls 16a, 16b and adjacent end wall 16d define a substantially right angle compartment D at the end of the tank 16 opposite the aforesaid compartment A.

In like manner, a partition 28 extending transversely across said tank 16 and connecting at its opposite ends to the side wall 16b and the central partition 17 defines with the latter and the aforesaid partition 20 a compartment therein identified by the reference character E.

To complete the overall configuration of the instant drainage tank 16 as is seen in FIGS. 2 and 6, a partition 29 is interposed between the aforesaid partitions 21 and 28 and connects at its opposite ends to the aforesaid side wall 16b and central partition 17 to thus define adjacent compartments identified respectively by the reference characters F and G, and which are likewise seen to be located between tank compartments E and A.

With this arrangement of tank compartments A to G inclusive, it will be seen that compartments B and C are disposed in tandem relation to each other thereby defining one linear leg of the aforementioned closed linear extracting path, said leg being identified in FIG. 6 by the reference character $P_1$, whereas compartments E, F and G are similarly disposed and in side by side relation to said compartments B and C to thus define a second linear leg of said path as is identified by the reference character $P_2$. And, likewise the opposed end compartments A and D of said tank are each of such configuration as to lie within and at the ends of both of said legs $P_1$ and $P_2$.

As previously mentioned, the instant extracting method, and apparatus for practicing the said method, incorporate the novel concept of carrying separate batches of the extract-bearing solid material through the closed linear extraction path as thus described, during which interval an extracting solvent is applied to said material.

For this purpose, a plurality of substantially rectangular baskets, each of which is identified by the reference numeral 30, are intended to be disposed within the aforesaid housing 10, being suspended above the drainage tank 16 and being moved preferably cyclically linearly therethrough, and successively over each of the aforementioned compartments A–G inclusive, during which interval solvent is applied to said solid material whereby the soluble components therein are thus readily removed.

To accomplish this, two pairs of rail members, identified by the reference numerals 31 and 32 respectively, as seen in FIGS. 1 and 2, are mounted within the housing 10 so as to extend substantially longitudinally therethrough, each pair being preferably located in spaced parallel rows adjacent the side walls 11 and 12 of said housing. The pair of rail members 31 in the instant assembly is supported upon the aforementioned channel 15 and a suitable I beams 33 disposed centrally within the drainage tank 16 and extending longitudinally centrally therealong, said rail members being thus disposed adjacent side wall 11 and in predetermined spaced relation above the drainage tank 16 and the aforementioned compartments thereof defining the aforesaid leg $P_1$ of said closed linear extracting path. As may be best seen in FIG. 1, the rail members 31 also preferably terminate within said housing 10 in spaced relation to the end walls 13 and 14 thereof, the purpose for which will be presently explained.

In like manner, the pair of rail members 32 is supported upon the aforementioned I beam 33 and opposite channel 15, said rail members extending longitudinally along said supports adjacent side wall 12 and at substantially the same level within the housing as the pair of rail members 31.

The rail members 32 likewise terminate at each end in spaced relation to the adjacent end wall of the aforesaid housing, and are disposed in spaced relation above the aforementioned compartments of said tank 16 defining the leg $P_2$ of said closed linear extracting path.

A pair of shaft members 41, as best seen in FIGS. 1 and 2, is secured to the underside of each basket 30, and rotatably carries a suitable flanged wheel 42 at each end thereof, said wheels being thus disposed to support and carry said basket along the aforementioned pairs of rail members 31 and 32.

As previously mentioned, the instant solvent extraction apparatus is intended to be operable to continuously carry separate batches of solid extract-bearing material cyclically through the aforesaid closed linear extracting path. The rail members 31 are thus intended to carry said basket along the aforementioned leg $P_1$ of this linear path and the rail members 32 in like manner are intended to carry said baskets along the aforementioned leg $P_2$ of said path. Each of the baskets 30 carries a predetermined quantity of solid material, having a solvent-extractable fraction such as an oil or the like, through said closed linear path, and to accomplish this each basket is intended during each extracting cycle to be separately intermittently moved from left to right upon the rail members 31 as viewed in FIG. 1, thence transferred onto the rail members 32 at the right end of the housing 10, then moved in a similar fashion from right to left over said latter rails, and thereafter transferred back to the aforesaid rail members 31 at the left end of said housing, and moved therealong to thus be in proper position for its next subsequent cycle.

To accomplish the transfer of each of the baskets 30 between the pairs of rail members 31 and 32, a transfer dolly 50, FIG. 3, is disposed at each end of the housing 10, and is adapted to successively receive each basket from one of said pairs of rail members and thereafter carry the same transversely across to said housing to the adjacent terminal end of the other pair of said rail members. For example, at the right end of the housing 10, as viewed in FIG. 1 the transfer dolly 50 located thereat is intended to successively receive each of the baskets 30 from the adjacent terminal end of the pair of rail members 31, and to then transfer the same to the same end of the adjacent pair of rail members 32. Conversely, the transfer dolly 50 at the left end of the housing 10 is intended to successively receive each of the baskets 30 from the adjacent terminal end of the rail members 32 and to thereafter transfer the same to the same end of the rail members 31.

For this purpose, a pair of transfer rails 52 is suitably mounted at each end of the housing 10, extending substantially transversely thereacross.

Each of the dollies 50 is preferably identical in construction, and is provided with suitable wheels 53 adapted to support the same on one of said pairs of transfer rails 52, being thus operable to carry said dolly therealong.

A pair of extension rails 56 is suitably mounted on each dolly 50 so as to extend longitudinally of the housing 10 and at substantially the same level as the rail members 31 and 32, and aligned therewith.

Said extension rails 56 are so arranged that, with its associated dolly 50 located adjacent the terminal end of one pair of said fixed rail members 31 or 32, said extension rails define a substantial longitudinal continuation of said adjacent pair. Upon moving either of said dollies along the transfer rails 52 so as to locate the same adjacent the opposed terminal ends of the rail members 32, said extension rails 56 thus define a longitudinal continuation of said latter rails.

With this assembly, it will now be realized that with one of the dollies 50 disposed adjacent one of the pairs of said fixed rail members 31 or 32, a basket 40 carried thereon may be moved onto the extension rails 56 of said dolly and the dolly may thereafter be moved along its associated transfer rails 52 to thus carry said basket to the opposite side of the housing 10 to a position adjacent the same end of the other pair of said fixed rail members whereby the extension rails are in substantial longitudinal prolongation with the same. Thereafter, said basket may be moved onto said other fixed pair of rail members to return to the starting point of the cycle.

*The Basket Moving Apparatus*

A pair of double-acting hydraulic cylinders 60, as best seen in FIG. 1, is provided for moving the aforesaid dollies 50 in the manner just described.

For this purpose, one of the cylinders 60 is attached to each side of the housing side wall 12 adjacent the transfer rails 52 in such manner that its piston rod 61 is substantially perpendicular to said side wall.

A pusher plate 62 is attached to the free end of the piston rod 61 and is likewise securely fastened to the end of the dolly 50 disposed on said adjacent transfer rails 52.

The opposite ends of each of said cylinders are likewise connected through suitable conduits which, in turn, are connected in circuit with a suitable fluid source whereby the piston may be reversibly actuated, as will be understood.

With this assembly, upon operation of said cylinders 60 the dollies 50 connected to the same will thus be propelled along the supporting transfer rails 52 and moved in the manner above described to thereby transfer the baskets 30 between the fixed rail members 31 and 32.

The instant extractor apparatus is likewise provided with hydraulically actuatable mechanism for transferring the basket 30 from the transfer dollies 50 and for moving the same onto and along each of the aforesaid fixed rail members 31 and 32.

For this purpose, a double-acting hydraulic cylinder 70 is attached to each housing end wall 13 and 14, the cylinder 70 on end wall 13 as best seen in FIG. 1 being preferably adjacent the left end of the rail members 31, whereas the cylinder 70 on end wall 14 of said housing being disposed adjacent the right end of the rail members 32.

The piston rod 71 of each of said cylinders mounts a pusher plate 72. The opposite ends of each cylinder are likewise connected to a suitable fluid source whereby the piston rod may be reversibly actuated.

With this construction, the transfer dolly 50 at the right end of the housing 10 as viewed in FIG. 1 is moved so as to dispose the same next to the rail members 32 whereby the extension rails 56 thereon are in longitudinal prolongation with the latter, the cylinder 70 on end wall 14 may thereafter be actuated so as to propel its piston 71 and attached pusher plate 72 into said housing to thereby engage with and push the basket 30 carried on said extension rails 56 onto the adjacent end of said fixed rail members 32.

When this occurs, the basket 30 that previously occupied said adjacent end of said rail members 32 is intended to be engaged by the oncoming basket from the transfer dolly 50 and pushed by the same to the left along said rail members. Likewise, each of the remaining baskets 30 located on the rail members 32 is intended to be engaged by the next adjacent basket located upstream therefrom with respect to the direction of movement of said baskets and hence will be moved thereby toward the left along said rail members a distance corresponding to the length of stroke of said cylinder 70.

In like manner, with the transfer dolly 50 at the left end of the housing 10 carrying a basket 30 and then moved by its cylinder 60 to its actuated position adjacent the left end of the pair of rail members 31, the cylinder 70 mounted on housing end wall 13 may thereafter be actuated so as to propel its piston rod 71 and attached pusher plate 72 into said housing to thereby engage said basket and move the same onto the adjacent end of said rail members 31. In this manner the baskets 30 previously disposed on said rail members 31 will also be pushed by the next adjacent basket upstream therefrom to the right therealong.

To facilitate each basket 30 pushing the next adjacent basket along its supporting fixed rails 31, 32, a bumper 74 (FIG. 3) is preferably attached to one end of the basket, projecting outwardly therefrom and positioned to engage said adjacent basket. In this manner said baskets 30 are maintained in predetermined spaced relation to each other while moving along said fixed rail members.

At the completion of a cycle of extracting for each of the baskets 30, at which time said basket is located at the "Dump" position over the aforementioned compartment B of the drainage tank 16 (FIG. 6) the contents of said basket are discharged to thus ready the same to receive the next batch of material for processing.

Figure 4:
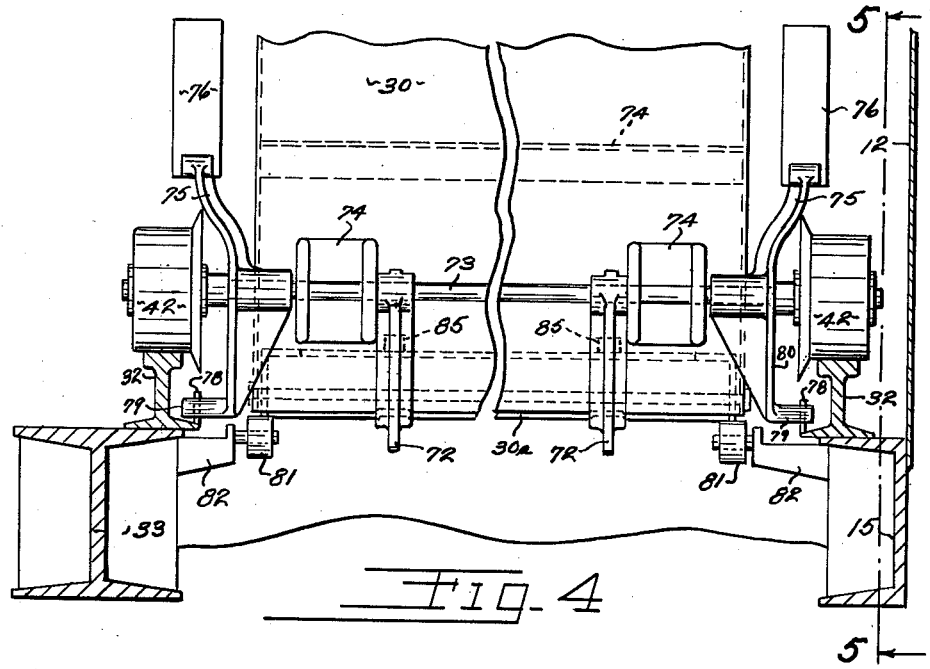
FIG. 4 is a fragmentary sectional view taken approximately along the plane indicated by the line 5—5 in FIG. 1.
Figure 5:
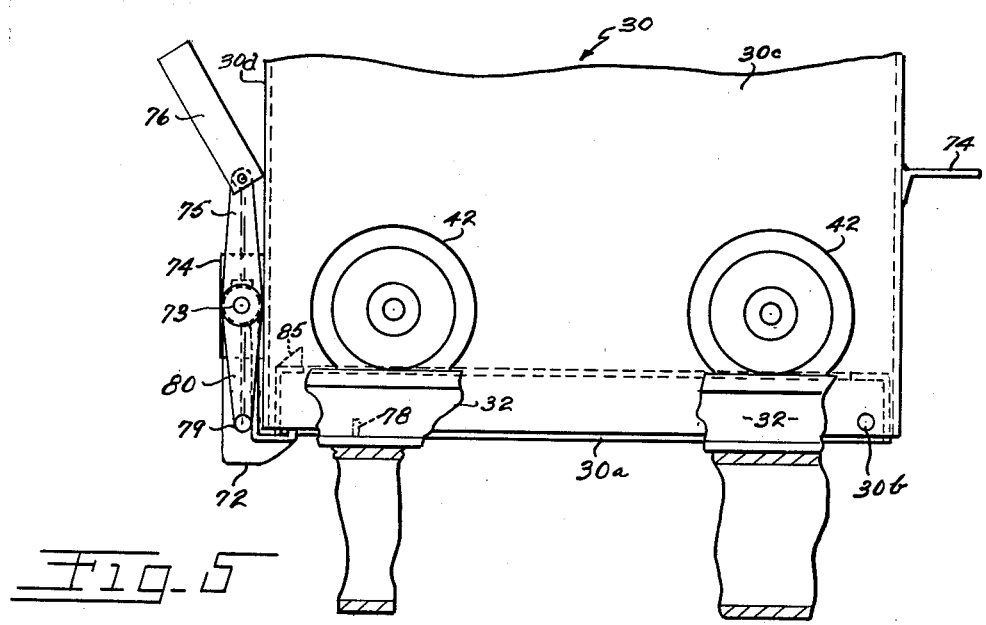
FIG. 5 is a fragmentary sectional view taken approximately on the plane indicated by the line 5—5 in FIG. 4.

To accomplish this, and with particular reference now to FIGS. 4 and 5, the base of each basket 30, as is identified by the reference numeral 30a, is sieve-like or foraminous construction to thus permit the miscella to readily drain therethrough, and is hinged by pin 30b at its one end to the opposed side walls 30c of said basket.

The opposite end of said base 30a is adapted to be engaged by a pair of latch elements 72 to thus retain it in a closed position over the bottom end of said basket.

As best seen in FIG. 4, each of the latch elements 72 is carried on a pivot bar 73 which is journalably mounted within suitable bearing plates 74 attached to the end wall 30d of said basket opposite to said hinged end of said base.

The latch elements 72 are biased into latching engagement with said base 30a or in a counterclockwise direction as viewed in FIG. 5, and for this purpose a pair of arm members 75 is securely fastened to said pivot bar 73 preferably adjacent the ends thereof. A suitable counterweight 76 is mounted on the free end of each arm member 75, said mounting being such that with each latch element 72 in its latching position said weights are disposed beyond center on the opposite side of the pivot bar 73 to thus bias said elements into said latching position.

As each basket 30 is moved to the "Dump" position, said latch elements are pivoted out of engagement with the base 30a to thus permit the same to swing downwardly whereby the residual solid material therein may fall into the receiving tank compartment B for eventual disposal.

To accomplish this a cam element 78 is secured to one of the rail members 31 and positioned to engage a follower 79 carried on an arm 80 mounted on the pivot bar 73 and swingably therewith. Said cam element is intended to be engaged as the basket 30 is moved over the receiving tank compartment B whereby the pivot bar 73 is pivoted clockwise as viewed in FIG. 5 to thus swing the latch elements 72 out of latching engagement with the aforesaid base 30a and permit the latter to swing downwardly about its hinge pin 30b thereby emptying said basket by gravity.

The empty basket 30 is then moved to the right along the rail member 31 (FIG. 6) toward the aforesaid "Fill" position.

During this movement, the base 30a of the basket 30 is swung upwardly to its closed or latched position.

For this purpose, a pair of rolls 81 (FIG. 4) is rotatably suspended on suitable brackets 82 disposed preferably opposite each other and mounted on the aforementioned I beam 33 and associated channel 15 carrying said rail members 31.

Said rolls are located upstream along said rail members 31 from the "Fill" position, and at a level below the axis of the hinge pin 30b for the base 30a of the basket 30. As the basket 30 is moved toward said "Fill" position, the rolls 81 engage the underside of the base 30a now in its open position, whereby said base is swung upwardly about its hinge pin 30b.

A pair of cam elements 85 attached to the swingable end of the base 30a is adapted to engage with the aforesaid latch elements 72 during this upward swinging movement of the latter, being operable to pivot said elements in a clockwise direction as viewed in FIG. 5 and hence out of the path of said moving base. When the base has been moved to its closed position said latch elements are then free to pivot in a counterclockwise direction into latching engagement with the same so as to retain said base in its said closed position.

With reference now directed to FIG. 6, the instant embodiment of extractor apparatus utilizes a total of eleven (11) of said baskets 30 to provide for continuously processing the extract-bearing solid material therein.

Assuming that one of said baskets has been previously moved to the position as is indicated by the indicia "Fill," as shown in FIG. 6, said basket is thus located to receive a predetermined quantity of extract-bearing material therein from a suitable overhead hopper (not herein shown) to thereby initiate the next extraction cycle for said basket.

During the interval that the basket 30 at the "Fill" position is receiving its charge, it is preferred to simultaneously direct a quantity of solvent material into the basket so that the same will be substantially thoroughly mixed, the means by which said solvent is thus provided being hereinafter described in detail.

After said basket has received its intended charge of extract bearing solid material and solvent, it is next moved to the position on the rail members 31 along leg $P_1$ of the closed linear extraction path to the position indicated by the indicia "Drain." Said basket while in the "Fill" position and the "Drain" position is disposed over the compartment C of the underlying drainage tank 16, and consequently a portion of the solvent mixed with a quantity of soluble extract material or miscella, as referred to in the art, drains into said compartment C.

As best seen in FIG. 3, each basket 30 is provided with an overflow trough 30d which overlaps the next adjacent basket to prevent the passage of solid material between said baskets and into the drainage compartments located therebelow.

After a predetermined interval, as will be later defined in greater detail, the basket 30 is moved from the "Drain" position to the position indicated by the indicia "Filter." At this position, the solvent material continues to filter through the extract bearing solid material, to remove an additional quantity of soluble extract material therefrom, and thence drains into the underlying drainage tank compartment D. With the basket thus disposed at the "Filter" position, it is preferred to take the miscella from the previous compartment C and to direct and thus recirculate the same into the basket located at said "Filter" position.

After a predetermined interval, the basket at the "Filter" position is thence moved to the transfer position as is identified by the reference character $T_1$, said position being hereinafter also referred to as the first transfer position.

As will be recalled, as said basket is moved to the transfer position $T_1$ it is moved upon the dolly assembly 50 located thereat and is thereafter carried by the latter across the housing 10 so as to be disposed at the transfer position adjacent the ends of the rail members 32, said latter position being identified in FIG. 6 by the reference character $T_2$ and hereinafter also identified as the second transfer position for said basket.

Thereafter the basket 30 is intermittently moved to three separate wash stations $W_3$, $W_2$ and $W_1$ disposed in tandem relation to each other along the rail members 32 defining the aforementioned leg $P_2$ of the closed linear extraction path so as to be located successively over the drainage tank compartments E, F, and G.

During this interval, various concentrations of miscella are directed to the basket whereby the same is operable to wash the solid material therein and thus effect the removal of an increasing amount of soluble material therefrom.

As the extraction cycle is thereafter continued, the basket is next moved from the wash station $W_3$ to the position along the track members 32 identified by the indicia "Drain." At this this position the basket is disposed over the drainage tank compartment G so that the miscella may drain into the same.

Next, the basket is moved to the position identified by the indicia "Solvent" whereupon said basket is located over the drainage tank compartment A, at which position fresh solvent is applied to the solid material therein for the purpose of rapidly removing any residual soluble material from the same.

After a predetermined interval, the basket is next moved to the position at the left terminal end of the rail members 32 as shown by the reference character $T_3$, said position being also hereinafter referred to as the third transfer position.

As previously mentioned, the dolly member 50 at the left end of the housing 10 (FIG. 1) is periodically moved to said transfer position $T_3$ so as to receive a basket thereon.

As said basket is disposed on said dolly member it is then returned to its initial position, identified by the reference character $T_4$ in FIG. 6, or at the left end terminal of the rail members 31, at which position the basket is located so as to be moved onto the latter. During the interval the basket is moving from the "Solvent" position to the several transfer positions $T_3$ and $T_4$ respectively, the basket 30 is located above the drainage tank compartment A and the solvent material, as mixed with the residual soluble material, is permitted to drain into said compartment so that when the basket is finally located at the transfer position $T_4$, substantially all, if not all the solvent and soluble material has drained from the material in the basket thereby leaving merely the substantially completely extracted insoluble residue therein. Upon final drainage, the aforesaid residue may contain approximately fifty percent (50%) solvent and perhaps a very small amount of residual oil.

After a predetermined interval, the basket is then moved off the dolly 50 and onto the track members 31, being hence disposed at the position therealong identified by the indicia "Dump" whereupon, as previously mentioned, the hingeable base 30a of the basket is opened to permit said extracted solid material to fall into the solid receiving tank compartment B whereupon the same may be removed.

The basket 30 is next moved to the position along the rail members 31 as identified by the indicia "Empty" to await the initiation of the next subsequent extraction cycle therefor, at which time the basket will be moved to the aforementioned "Fill" position and is thereby ready to repeat said cycle of movement.

The routing of the solvent liquid to the various positions along the closed linear extraction path is shown in FIG. 6, and is what is known in the industry as a countercurrent system, which will now be described in detail.

As was previously mentioned fresh solvent is distributed to each of the baskets 30 in sequence as the same is disposed in the position identified by the indicia "Solvent," wherein the basket is located above the drainage tank compartment A. For this purpose a suitable conduit 130 is disposed directly above said basket and thus in position to direct the solvent into the same. Said conduit, although not herein shown, is connected in fluid circuit with a suitable source of a conventional solvent material.

As said solvent is thus directed to the basket located therebelow to thereby remove the residual soluble material from the solid material therein, the resulting miscella which is of low concentration, drains into compartment A.

This dilute miscella is thence successively circulated to the baskets located at each of the aforementioned "Wash" positions located respectively above the drainage tank compartments G, F, and E.

For this purpose, the compartment A of the drainage tank 16 is connected through conduits 131 and 132 to the input side of a conventional pump 133, the output of said pump 133 being connected by conduit 134 to direct the miscella from compartment A to the basket located at the "Wash" position $W_3$ over compartment G.

The compartment G is likewise connected by conduit 136 to the input side of conventional fluid pump 137 whereby the miscella draining into said compartment is thus removed.

The output side of the pump 137 is connected to a conduit 138, the opposite end of the latter being disposed over the basket 30 located at the wash position $W_2$ above tank compartment F.

A conduit 140 connects the compartment F to the input of a conventional fluid pump 141 whereby the miscella draining into said compartment is thus removed. The output side of the pump 141 is connected to a conduit 142, the opposite end of the latter being disposed over the basket at the "Wash" position located above the drainage tank compartment E. A conduit 143 having its one end communicating with compartment E, and its opposite end in parallel with the aforementioned conduit 140 connected to the input of pump 141, permits the recirculation of the miscella from compartment E back into the pump 141 wherein it is mixed with the miscella draining from compartment F, the resulting mixture being thereafter redirected through conduit 142 to the basket located above said compartment E.

Conduit 145 likewise connected at its one end to the compartment E is effective to remove a portion of the miscella draining therein and to connect the same to a conventional pump 147, the output end of said pump being connected to conduit 148, the opposite end of said conduit 148 being located directly above the basket at the "Fill" position so as to be mixed with the fresh extract bearing solid material being loaded into the basket at said position.

In this manner, a portion of the miscella draining into the tank compartment E is directed into the basket at the "Fill" position so that the extraction cycle for the charge in said basket is thus initiated.

The miscella draining into the tank compartment C at said "Fill" position is connected by conduit 151 to the input end of a conventional pump 152, the output of the latter being connected through serial conduits 153 and 154 to a position located above the "Filter" station. A portion of the miscella from the tank compartment C is likewise taken from the output side of the pump 152 and directed through a conduit 156, connected in parallel with the aforesaid conduit 153, to the conduit 148 so that a portion of said miscella is thus recirculated and directed to the basket located at the "Fill" position above said compartment C.

The miscella draining into the compartment D is thereafter connected by means of a conduit 160 to the input side of a conventional pump 161, the output end of the latter being likewise connected through conduit 163 to a suitable storage reservoir or the like, not herein shown, whereby the same may be conveniently kept until further processing to separate the soluble material from the solvent.

It will now be realized that the solvent distribution system as just described, is substantially what is known in the art as a counter current system, that is to say the solvent is transmitted throughout said apparatus in substantially the opposite direction to the direction of movement taken by the extract bearing material. In this manner therefore, the miscella is a minimum concentration with respect to the soluble extract material therein at the "Solvent" position in said apparatus and thereafter progressively increases in concentration as the same is transmitted successively in a countercurrent direction to the "Filter" position at the starting point for the extraction cycle.

*The Hydraulic Control System*

As previously mentioned, the hydraulic cylinders 60 and 70 are preferably connected in a hydraulic control circuit now to be described in detail, which functions to sequentially operate the same so as to move each of the baskets 30 intermittently cyclically through the aforementioned closed linear extraction path.

Figure 7:
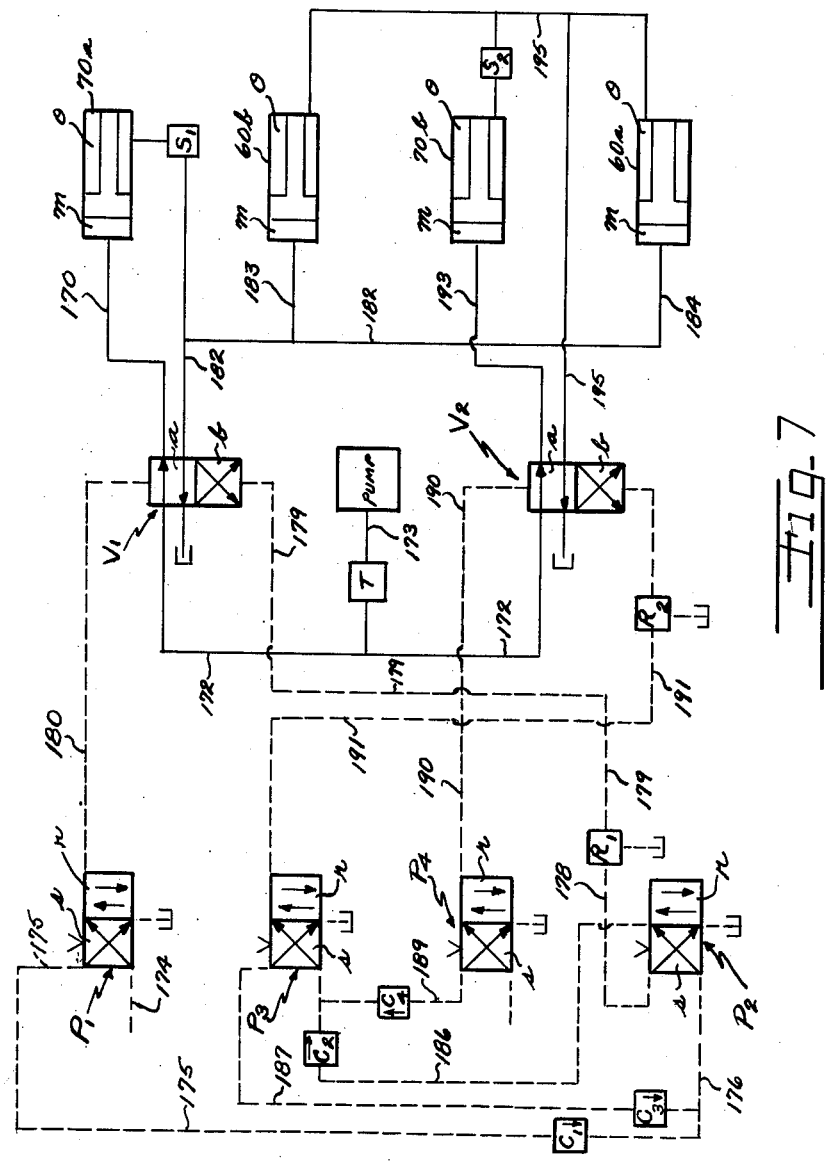
FIG. 7 is a diagrammatic view of a preferred hydraulically actuated control system for the apparatus of FIG. 1; and, FIG. 8 is an electrical control system which may be alternately used to provide for the control of the instant basket extractor apparatus.
Figure 8:
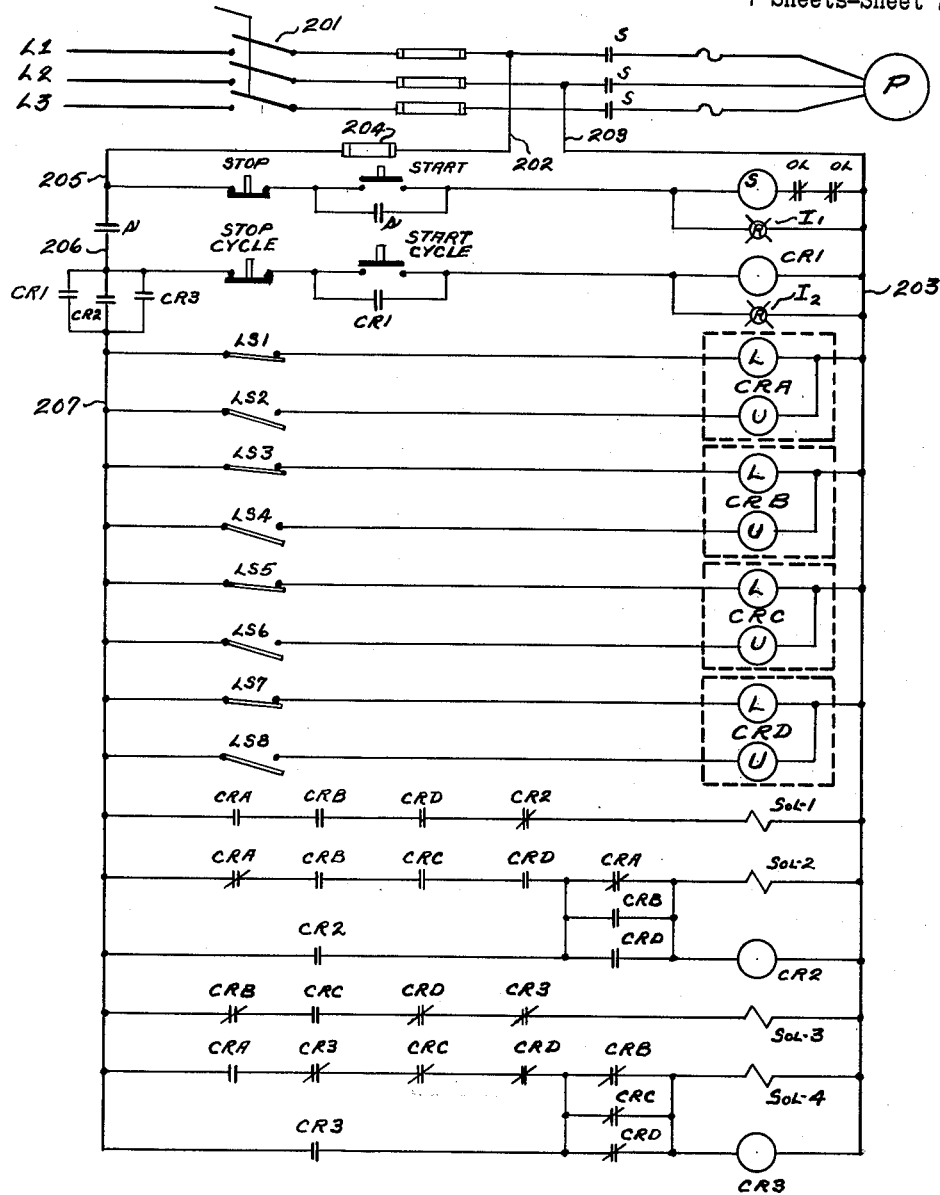

For this purpose, and with particular reference to FIG. 7, the hydraulic cylinder 70 mounted on the housing end wall 13 is identified in said control circuit by the reference number $70a$ merely to distinguish the same in its sequential operation, whereas the cylinder 70 mounted on the housing end wall 14 is similarly identified by the reference numeral $70b$.

In like manner and for the same purpose, cylinder 60 mounted on the side wall 12 adjacent the right end of the housing as viewed in FIG. 1, is identified by the reference numeral $60a$ whereas the remaining cylinder at the left end of said housing is identified by the reference numeral $60b$.

The several components of the hydraulic control circuit of FIG. 7 are in the respective position occupied thereby at the conclusion of one complete sequence of operation of the aforesaid hydraulic cylinders, whereby the ram or piston of each of the latter is in its retracted position.

As will be recalled, to initiate the operation of the extractor apparatus and thereby start one of the baskets 30 along its aforementioned closed, linear extraction path, the hydraulic cylinder $70a$ (FIG. 7) is actuated to propel its piston rod into the housing 10 and thus move the baskets 30 along the rails 31 to thereby position said one basket at the "Fill" position.

To accomplish this actuation of said cylinder $70a$, one end of said cylinder is connected by conduit 170 to a conventional pilot operated two-position, four-way control valve $V_1$ which is selectively actuated to either of its two positions $a$ or $b$.

A pair of pilot valves $P_1$ and $P_2$, each of which is likewise a two-position, four-way valve, function to automatically operate the control valve $V_1$, each of said pilot valves being selectively actuated to either of two positions $r$ and $s$.

A conduit 172 is connected in series circuit with the control valve $V_1$, and a conventional timer device T, the latter, in turn, being connected through conduit 173 to a suitable hydraulic pump whereby fluid is thus provided to said circuit.

The pilot valve $P_1$ is connectedf by conduit 174 to said pump and by conduit 175 to a one-way check valve $C_1$ which permits fluid to flow therethrough only in the direction shown by the arrow therein, said check valve being in turn, connected by conduit 176 to the pilot valve $P_2$.

Conduit 178 is connected between the pilot valve $P_2$ and a conventional pressure relief valve $R_1$, the latter, in turn, being connected by conduit 179 to one end of the control valve $V_1$.

As will be later apparent, merely to distinguish between the fluid circuit for the hydraulic cylinders, and the supply pump therefor from the pilot valve and control valve circuit, the conduits for said hydraulic cylinders are shown in full lines whereas the conduits interconnecting the pilot valves and the control valves are shown in dotted lines.

With the hydraulic circuit as thus far described, and assuming that all pistons of said cylinders are in their retracted position, the piston of cylinder $70a$ is disposed, upon movement to its retracted position, to actuate pilot valve $P_1$ to its "$r$" position. As this occurs, the pump is connected through conduits 174, 175, check valve $C_1$, conduit 176, pilot valve $P_2$, also in its "$r$" position as a result of being operated by the previous retraction of the piston for cylinder $60a$, and thence through conduit 178, relief valve $R_1$ and conduit 179 to the control valve $V_1$ whereby said control valve is actuated to its "$a$" position.

Thereafter when the timer device T permits the hydraulic fluid under the pump pressure to flow through connected conduit 172, said fluid is thus permitted to flow through conduit 170 and into side "$m$" of the cylinder $70a$ whereby its piston rod is propelled outwardly into the housing 10. When this occurs, it will be recalled that the baskets 30 are moved along the rail members 31 from left to right as viewed in FIG. 1 to thus position each of the baskets 30 in the next advanced position therealong.

Upon the piston rod of cylinder $70a$ being fully extended it is then disposed to actuate the pilot valve $P_1$ to its "$s$" position whereby the pump is connected through conduit 180 to the opposite end of the control valve $V_1$ whereby said control valve is actuated to its "$b$" position.

As a result, conduit 172 in communication with said pump is thus connected through control valve $V_1$ in its "$b$" position to conduit 182 which, in turn, is connected in parallel with conduits 183 and 184 connected respectively to the side "$m$" of each of the hydraulic cylinders $60a$ and $60b$.

Cylinders $60a$ and $60b$ are thereby actuated to simultaneously propel their piston rods into the housing 10 where, as will be recalled, the piston rod of cylinder $60a$ is operable to transfer the basket 30 previously deposited onto the dolly 50 at the transfer position $T_1$ as shown in FIG. 6, across said housing to the transfer position $T_2$ adjacent the right end terminal of the rail members 32.

And, as will likewise be recalled, the piston rod of cylinder $60b$ is operable to move the dolly 50 at transfer position $T_4$, as seen in FIG. 6, across said housing to transfer position $T_3$ where said dolly is thus located to receive the endmost basket next to be moved along the aforesaid rail members 32.

As the hydraulic fluid is thus connected to the "$m$" side of each cylinder 60$a$ and 60$b$, the pressure in conduit 182 is intended to increase, as will be understood, until it reaches a predetermined valve whereupon it actuates a conventional pressure responsive valve $S_1$ connected in series with said conduit 182 and the "$o$" side of the hydraulic cylinder 70$a$ to thereby permit fluid to flow into the latter and cause the retraction of its piston.

When the piston of said cylinder 70$a$ is fully retracted it actuates the pilot valve $P_1$ to its "$r$" position.

To provide for the remaining portions of the sequential cyclic operation for the hydraulic cylinders, the instant control circuit is preferably provided with a second control valve $V_2$ identical in construction to the aforesaid control valve $V_1$, and hence selectively actuatable to one of two positions identified as "$a$" or "$b$" positions.

To accomplish the actuation of valve $V_2$, a pair of pilot valves $P_3$ and $P_4$ are provided being likewise identical in construction to the aforesaid pilot valves $P_1$ and $P_2$ and thus each selectively actuatable to one of two positions, depicted as "$r$" and "$s$" positions.

A conduit 186 is connected between the pilot valves $P_2$ and $P_3$, a suitable check valve C being likewise in said line to thus provide for a fluid flow in the direction of the arrow indicated at said check valve, or from pilot valve $P_2$ to valve $P_3$.

Conduit 187 is likewise connected between pilot valves $P_2$ and $P_3$ being connected to conduit 176, a check valve $C_3$ being also connected in series in said conduit 187 to thus provide for a fluid flow therethrough from valve $P_3$ to valve $P_2$. Conduit 189 is connected between pilot valves $P_3$ and $P_4$, a suitable check valve $C_4$ being likewise in said line to thus provide for a fluid flow from valve $P_4$ to valve $P_3$.

A conduit 190 is connected between one end of the control valve $V_2$ and the pilot valve $P_4$ and, in like manner, conduit 191 connects the pilot valve $P_3$ to the opposite end of the control valve $V_2$. A conventional pressure relief valve $R_2$ may be disposed in said line to thus protect the connected fluid circuit from excessive pressures as will be understood.

Conduit 193 is connected between the control valve $V_2$ and the "$m$" side of the hydraulic cylinder 70$b$, whereas conduit 195 is connected between said control valve $V_2$ and to the "$o$" side of each of the cylinders 60$a$, 60$b$ and 70$b$.

To complete the control circuit, a suitable pressure responsive valve $S_2$ identical preferably to the aforesaid valve $S_1$, is disposed in series with the conduit leading to the "$o$" side of cylinder 70$b$, the purpose and function of which will be presently described.

Returning now to the sequential operation of hydraulic cylinders, it will be recalled that the cylinder 70$a$ has completed its stroke, so that its piston is once again retracted to actuate the pilot valve $P_1$ to its "$r$" position. Cylinders 60$a$ and 60$b$ are each in its piston-extended position so that the pilot valves $P_2$ and $P_3$ are each in the "$s$" position.

At this instant, the pilot valve $P_1$ in its "$r$" position connects the aforesaid fluid pump through conduit 175, check valve $C_1$, conduit 176, pilot valve $P_2$ in its "$s$" position, conduit 186, check valve $C_2$, to the pilot valve $P_3$ likewise in its "$s$" position.

As a result, fluid flows through conduit 191, pressure relief valve $R_2$ and to the control valve $V_2$ effective to actuate said control valve to its "A" position.

When this occurs, and assuming the timer device permits fluid to flow through conduit 172, said fluid will flow into and through conduit 193 to the "$m$" side of the cylinder 70$b$ which, as will be recalled, is located at the transfer position $T_2$ as shown in FIG. 6. As a result, the piston rod of cylinder 70$b$ will be extended so as to push the basket 30 on the dolly 50, disposed at said transfer position, onto the rail members 32 whereby each of the baskets disposed on the latter will likewise be moved from right to left therealong, as viewed in FIG. 1, thereby moving the endmost basket 30 at the opposite end of said rail members onto the dolly 50 now disposed at transfer position $T_3$.

When the piston of cylinder 70$b$ is fully extended it actuates pilot valve $P_4$ to its "$s$" position, and fluid is then permitted to flow from the pump through conduit 190 to the opposite end of the control valve $V_2$ to thus actuate the same to its "$b$" position.

When this occurs, fluid is permitted to flow through conduit 172, control valve $V_2$ in its "$b$" position, through conduit 195 simultaneously to the "$o$" side of each cylinder 60$a$ and 60$b$ to thereby cause their pistons to be retracted. As a result, the dollies 50 attached to said pistons are moved across the housing to their original position adjacent the opposite ends of the rail members 31.

The basket previously moved onto the dolly at the transfer position $T_3$ as viewed in FIG. 6 as a result of the actuation of cylinder 70$b$, is thereby moved with said dolly to the transfer position $T_4$ adjacent the left terminal end of the rail members 31 to await the next actuation of the cylinder 70$a$.

Pilot valves $P_2$ and $P_3$ operated respectively by the pistons of cylinders 60$a$ and 60$b$ are thus actuated to their "$r$" positions upon the retraction of the pistons of said cylinders.

As the pressure builds up within conduit 195 as a result of the pistons of cylinders 60$a$ and 60$b$ becoming fully retracted, the pressure responsive valve $S_2$ will be eventually actuated so as to connect the conduit 195 to the valve $S_2$ and the "$o$" side of the cylinder 70$b$. The piston of cylinder 70$b$ is then moved to its retracted position to thereby await the next subsequent sequential operation therefor.

As the piston of cylinder 70$b$ is moved to its retracted position it actuates pilot valve $P_4$ to its "$r$" position. The pump is then connected through said valve $P_4$ in "$r$" position, conduit 189, check valve $C_4$, pilot valve $P_3$ in "$r$" position, conduit 187, check valve $C_3$, conduit 176, pilot valve $P_2$ in "$r$" position, conduit 178, pressure relief valve $R_1$, conduit 179 to the control valve $V_1$ which is effective to actuate said valve $V_1$ to its "$a$" position.

This completes one sequential operation of the cylinders 60$a$, 60$b$ and 70$a$, 70$b$ with the control valve $V_1$ in its "$a$" position to await the next subsequent operational sequence therefor as is determined by the timer device T.

The Electrical Control Embodiment

Figure 8:
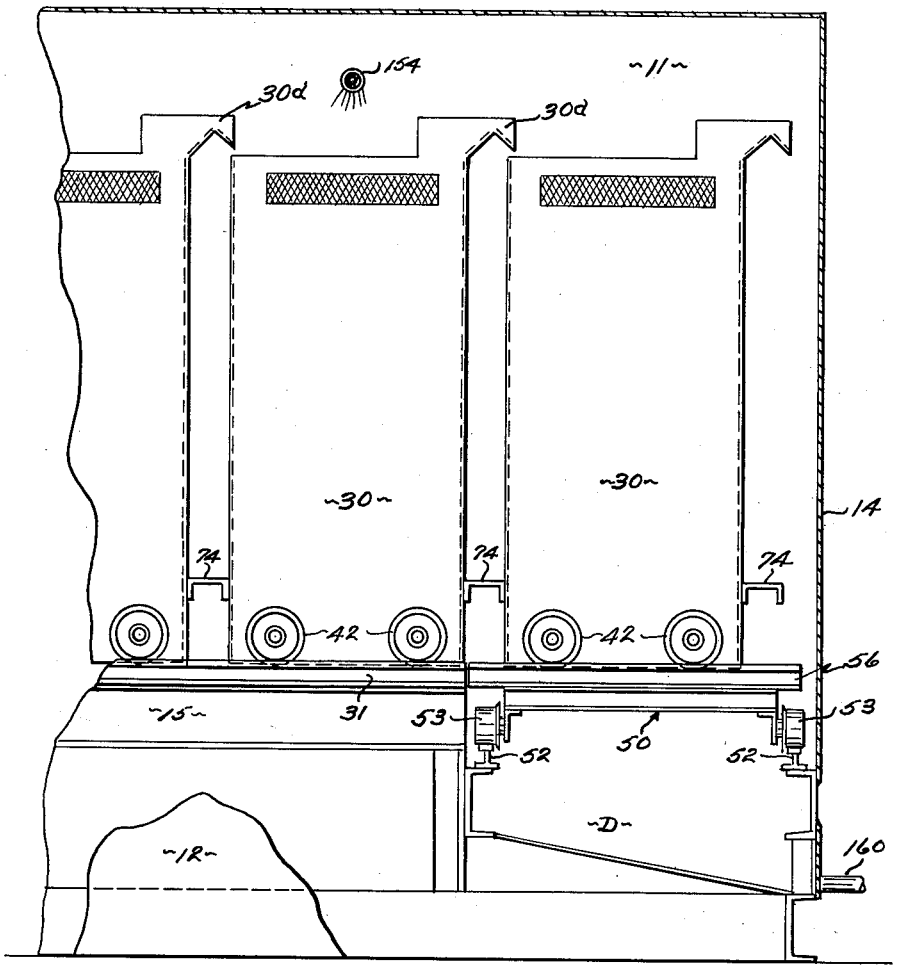

With reference directed now to FIG. 8, an electrical control circuit is herein shown which may be substituted for the pilot valves $P_1$–$P_4$ and the associated conduit circuit therewith in the hydraulic control circuit of FIG. 7, to thus provide for an equivalent sequential operation of the hydraulic cylinders 60$a$, 60$b$ and 70$a$, 70$b$.

To accomplish this, the electrical control circuit of FIG. 8 includes a suitable electric motor driven pump P which is connected across a source of electrical energy such as a three phase 220 volt A.C. source indicated by the power lines $L_1$, $L_2$ and $L_3$.

A manually-operated main switch 201 is connected in series between the aforesaid source and pump to thus enable the latter to be manually disconnected, and in like manner, a normally-open contact $s$ of a magnetic starter is likewise connected in series in each of said power lines preferably between the aforesaid main switch and pump, to thus provide for the remote control of said pump as will be hereinafter more clearly understood.

A pair of line conductors 202 and 203 is connected across power lines $L_1$ and $L_2$, line conductor 202 connecting in turn in series with a suitable fuse element 204, the latter connecting to a line conductor 205.

A normally-closed push-button type switch, as identified by the indicia "STOP" is connected at one end to the line conductor 205 and at the opposite end to a similar normally-open push button type switch as is identified by the indicia "START." Said "START" button is likewise connected in series with the coil S of the aforesaid magnetic starter, the latter, in turn, being connected in series with a pair of suitable conventional thermal overload normally-closed switches as identified each by the indicia "OL," the latter connecting to the aforementioned line conductor 203.

With this circuitry, it will be realized that by momentarily depressing the "START" button the coil S of the magnetic starter will be energized so as to close each of its normally-opened contacts $s$ in the pump circuit to thereby energize the motor driving the latter and cause the hydraulic fluid to be delivered to the conduit 173 and connected timer device T.

A normally-open contact $s$ of the aforesaid magnetic starter is likewise connected across the "START" button which, as will be understood, is effective to close upon energization of its coil so as to lock the same across the line conductors 203 and 205 and hence the power lines $L_1$ and $L_2$.

A suitable indicator lamp I may also be connected across the coil $s$ of the magnetic starter to thus indicate the energization of the latter and hence the actuation of the motor driven pump P.

A normally-open contact $s$ of the magnetic starter is likewise connected in series with conductor 205 and conductor 206, the latter being connected to one end of a parallel combination of three normally open contacts identified for the moment by the reference characters CR1, CR2 and CR3. The opposite end of said parallel group is connected to line conductor 207.

A normally-closed push-button type switch identified as "Stop Cycle" is connected on one side to the aforesaid conductor 206 and on its opposite side in series with a normally-open push-button type switch identified as "Start Cycle." Said latter switch is connected to one side of a coil of a relay CR1, the opposite side of the latter being connected to line conductor 203. An indicator lamp I is likewise connected across said coil of relay CR1, and a normally-open contact CR1 of said relay is connected across the "Start Cycle" switch.

With the coil $s$ of the magnetic starter energized, the normally-open contact $s$ thereof connected between conductors 205 and 206 is closed, thus connecting said latter conductor 206 to said power line $L_1$.

With the circuit as thus far actuated, the "Start Cycle" switch may then be momentarily depressed to its closed position to thereby connect the coil of relay CR1 across conductors 203 and 206 and energize the same, whereby the contacts CR1 thereof are closed, this connecting the conductors 207 to the aforesaid power line $L_1$ and locking in the energizing circuit for said relay coil. In this manner, the instant electrical control switch is operable to start a cycle of sequential operation of the hydraulic cylinders 60a, 60b and 70a, 70b.

For this purpose, the present electrical control circuit of FIG. 8 is provided with a conventional double-acting relay CRA, which relay is intended to replace the pilot valve $P_1$ (FIG. 7) and which, in addition, is provided with a pair of energizing coils identified respectively by the reference characters L and U.

The coil L of said relay CRA is connected in series with a suitable switch LS–1 said circuit being connected across the line conductors 203 and 207.

The energizing coil U of said relay CRA connected in series with an electrical switch LS–2, said circuit in like manner being connected across said line conductors 203 and 207.

The energizing coil U of said relay CRA connected in series with an electrical switch LS–2, said circuit in like manner being connected across said line conductors 203 and 207.

In place of the pilot valve P of the hydraulic control circuit (FIG. 7) the instant electrical control circuit is provided with a similar double-acting relay as identified at CRB in FIG. 8, said relay likewise having a pair of energizing coils as identified by the reference characters L and U.

The energizing coil L of relay CRB is connected in series with a switch element LS–3, said circuit being connected across the line connectors 203 and 207, and, in like manner, the energizing coil U of said relay CRB is connected in series with switch element LS–4 said circuit being also connected across said line conductors.

In place of the pilot valve $P_4$ of the hydraulic control circuit, the instant electrical control circuit is provided with a similar double-acting relay CRC, said relay likewise having a pair of energizing coils L and U. The energizing coil L of relay CRC is connected in series with switch element LS–5 whereas the energizing coil U of said relay is connected in series with switch element LS–6, each of said circuits, in turn, benig likewise connected across the aforesaid line conductors 203 and 207.

In place of the pilot valve $P_2$ in the hydraulic control circuit of FIG. 7, the instant embodiment of electrical control circuit is provided with a double-acting relay CRD, said relay likewise having a pair of energizing coils, L and U. The energizing coil L of relay CRD is connected in series with switch element LS–7 and in like manner its energizing coil U is connected in series with a switch element LS–8, said circuits being connected, in like manner, across the line conductors 203 and 207.

To reversibly actuate each of the control valves $V_1$ and $V_2$, the instant electrical control circuit is provided with a series of four solenoids SOL–1, SOL–2, SOL–3 and SOL–4.

The solenoids SOL–1 and SOL–2 are mounted on opposite ends of the control valve $V_2$ to thus provide for its reversible actuation as will be understood, whereas, solenoids SOL–3 and SOL–4 are mounted on opposite ends of the control valve $V_1$ and thus operable to provide for its reversible actuation.

One side of the coil of solenoid SOL–1 is connected to line conductor 203 whereas the opposite side of said coil is connected in series with a normally-closed contact of a control relay CR2, said normally-closed contact, in turn, being connected in series with a normally-open contact of each of the aforementioned relays CRA, CRB and CRD. The normally-open contact of relay CRA in said series circuit is connected to the line conductor 207.

The coil for solenoid SOL–2 is connected in series circuit across the line conductors 203 and 207, said series circuit including a pair of normally-closed contacts of relay CRA, a normally-open contact of relay CRB, and a normally-open contact of each of the relays CRC and CRD.

A second normally-open contact of each of the relays CRB and CRD are connected in parallel across the normally-closed contact of relay CRA interposed in said series circuit between the solenoid coil and the first mentioned contact of relay CRD.

The coil of the aforementioned control relay CR2 is connected across line conductor 203 and one side of the second normally-open contacts of relay CRD on said solenoid SOL–2 circuit. The opposite side of said contact of relay CRD is connected to a normally-open contact of control relay CR2, said contact being connected at its opposite side to the line conductor 207.

The coil of solenoid SOL–3 is connected in a series circuit across the line conductors 203 and 207, said circuit, leading from said coil, comprising a normally-closed contact of a control relay CR3, a normally-closed contact of relay CRD, a normally-open contact of relay CRC and a normally-closed contact of relay CRB.

The coil for the solenoid SOL–4 is connected in a series circuit across line conductors 203 and 204, said circuit leading from said coil comprising a normally-closed contact of relay CRB, a normally-closed contact of relay CRD, a normally-closed contact of each of the aforesaid relay CRC and CRB, and a normally-open contact of relay CRA.

A second normally-closed contact of each of the relays CRC and CRD is connected in parallel across the normally-closed contact of relay CRB interposed in said series circuit between the solenoid coil and the first mentioned normally-closed contact of relay CRD.

To complete the electrical control circuit, the coil of the control relay CR3 is connected across the line conductor 203 and one side of the second normally-closed contact of relay CRD in said solenoid SOL–4 circuit. The opposite side of said contact of relay CRD is connected to a normally-open contact of control relay CR3, the opposite side of said contact connecting to the line conductor 207.

The manner in which the above described electrical control circuit is intended to operate to provide for the sequential operation of the hydraulic cylinders 60a, 60b and 70a, 70b, will now be described in detail.

*Operation of the Electrical Control Circuits*

As shown in FIG. 8, the several components of the electrical control circuit are located in their "Rest" or end of cycle position taken thereby at the conclusion of a complete cyclic actuation of the aforesaid hydraulic cylinders.

At this instant, it will be recalled that the control valve $V_1$ is intended to be moved to its "a" position to thus await the timer device T to initiate the next cycle and the control valve $V_2$ is in its "b" position.

Assuming now that the pump P has been started through its energization circuit, the "Start Cycle" switch button is momentarily depressed to energize control relay CR1 thereby closing its open contact in the circuit of line conductor 206 to thereby provide power to line conductor 207. The open contact of said control relay CR1 connected across the "Start Cycle" button is likewise closed to lock said relay coil across the line conductors 206 and 203. The indicator lamp $I_2$ is thus ignited to visually signify the start of the next cycle.

The timer device T then permits fluid to flow through control valve $V_1$ in its "a" position to the hydraulic cylinder 70a to extend its piston rod and thereby cause the baskets 30 to be moved along the rail members 31 as previously described.

As the piston rod of cylinder 70a is extended it opens the switch element LS1 thus disconnecting the coil L of double-acting relay CRA from its power source.

Thereafter, when the piston rod of said cylinder 70a is fully extended it trips the switch element LS2 to connect the coil U of said relay CRA across the line conductors 203 and 207 thereby energizing said coil.

As a result, the normally-open contact of relay CRA in the circuit for the coil of solenoid SOL–4 is closed to thus energize said coil which is effective to actuate the hydraulic control valve $V_1$ to its "b" position.

At the same time, the normally-open contact CRA in the circuit of coil for solenoid SOL–1 is closed, and the normally-closed contact CRA in the coil circuit of solenoid SOL–2 is opened.

With the control valve $V_1$ in its "b" position fluid is then directed simultaneously to the cylinders 60a and 60b whereby to extend their respective piston rods into the extractor housing and cause the dollies 50 connected thereto to move to their respective positions adjacent the ends of the rail members 32.

As the piston rod of cylinder 60b moves to its extended position it is adapted to open switch element LS3 to thus disconnect the coil L of relay CRB from its power source. In like manner, as the piston rod of cylinder 60a is extended it opens switch element LS8 thus disconnecting coil L of relay CRD from said power source.

When the piston rod of the cylinder 60b is fully extended, it is adapted to engage and close switch element LS4 to thereby energize the coil U of relay CRB.

When this occurs, the normally-open contact of relay CRB in each of the circuits of solenoid coils SOL–1 and SOL–2 is closed, and the normally-closed contacts of relay CRB in each of the circuits for solenoid coils SOL–3 and SOL–4, are opened.

When the piston rod of cylinder 60a is fully extended it trips switch element LS8 to thus energize coil U of relay CRD thereby closing each of the normally-open contacts of said relay in each of the circuits for solenoid coils SOL–1 and SOL–2, and likewise opening the normally-closed contacts of said relay CRD in each of the circuits for the solenoid coils SOL–3 and SOL–4.

When this occurs, the coil of solenoid SOL–1 is energized to thus cause the hydraulic control valve $V_2$ to move to its "a" position as viewed in FIG. 7. Fluid is then permitted to flow to cylinder 70b to extend its piston rod into the housing 10 and thereby cause the transfer of the basket from the dolly at transfer position $T_2$ onto the rail members 32.

As the piston rod of cylinder 70b is fully extended it actuates switch element LS6, so as to energize the coil U of relay CRC thereby closing the normally-open contacts of said relay CRC in each of the circuits for the solenoid coils SOL–2 and SOL–3, and opening the normally-closed contacts of relay CRC in the circuit for solenoid coil SOL–4.

The pressure responsive switch $S_1$ is then preferably actuated to permit the retraction of the piston rod of cylinder 70a whereby the switch element LS1 is again closed to energize coil L of relay CRA to again close its contacts in the circuit for solenoid coil SOL–2 and open the contacts CRA in each of the circuits for solenoid coils SOL–1 and SOL–4.

The solenoid coil SOL–2 is thus energized to actuate the hydraulic control valve $V_2$ to its "b" position whereby the piston of cylinders 60a and 60b are then retracted. And, as said piston rods move to their retracted positions they actuate switch elements LS7 and LS3 to thus energize the coils L of each of the relays CRD and CRB which are then operable to return their respective relay contacts to the condition thereof as depicted in FIG. 8.

The pressure responsive switch $S_2$ delays the retraction of the piston rods of cylinder 70b until the contacts of relays CRB and CRD in the circuit of solenoid coil SOL–3 have been closed so that said coil may be then energized to actuate the hydraulic control valve $V_1$ to its "a" position to await the next cycle.

Thereafter, the pressure responsive switch $S_2$ permits the piston rod of cylinder 70b to retract whereby it actuates switch element LS5 energizing coil L of relay CRC thus returning the contacts of said relay in each of the circuits of solenoid coils SOL–2 and SOL–3 to its open position, and the contact in the circuit of solenoid coil SOL–4 to its closed position.

The electrical control circuit as first described is also provided with several "fail safe" operational features which are intended to prevent one of the control valves $V_1$ and $V_2$ from being inadvertently actuated.

With reference to FIG. 8, it will be seen that during the interval when the cylinders 60a, 60b and 70b are energized to transfer the basket 30 at transfer position $T_2$ onto the rail members 32, the control relay CR2 is energized and locked in said energized condition so that its contact CR2 in the circuit for the line conductor 206 is retained in its closed position to thus prevent power from being disconnected from line conductor 207. In this manner the coil of solenoid SOL–2 is locked in its energized position through the relay contact CR2 connected to the coil of said relay, and the normally-closed contact of relay CRA connected to the solenoid coil SOL–2. As a result, the control valve $V_2$ is actuated to, and retained in, its "b" position thus connecting the "o" side of each of said cylinders 60a, 60b and 70b to said pump whereby if said valve is inadvertently connected to the pump, said cylinders will be retained in their retracted position.

Similarly with the control valve $V_1$ in its "a" position, and the piston rod of cylinder 70a fully extended to thus close the normally-open contact in the circuit of solenoid coil SOL–4, whereby the latter is energized, the control relay CR3 is likewise energized and locked in said condition across the line conductors 203 and 207. The contact of control relay CR3 in the circuit of line conductor 206 provides an additional path for power to be delivered to line conductor 207.

The coil of solenoid SOL–4 will thereby be locked in its energized position through the relay contact CR3 connected to the coil of said relay and the normally closed contacts CRB, CRC and CRD in said solenoid circuit. As a result, the control valve $V_1$ is actuated to and retained in its "b" position during the next succeeding interval when the baskets are transferred onto the dollies 50 located at the transfer positions $T_2$ and $T_3$ in said extractor housing 10.

The timer device T is so adjusted, when used with the number of baskets as shown in FIG. 1, that each of the 20 baskets dwell in a stationary position within said extraction path three-fourths of the time required to complete its entire linear path through the extractor. And, as will be realized, as the number of baskets within any single extraction apparatus is increased to accommodate larger capacities, the dwell time of any one basket decreases, assuming that the same cycle time is used, but, the ratio of the dwell time to the time of movement for each basket in each cycle remains constant. Thus the motion of the basket throughout the linear path of the extractor is an intermittent motion, three-fourths of the time at dwell or stationary at the several positions therealong, and one-fourth of the time being in motion in a linear direction through said closed linear extraction path.

As a result of this intermittent linear movement of nonconnected baskets within the extraction apparatus of this invention, several simplicities in operating procedures, fabrication methods and extraction efficiencies are realized. For example, this linear intermittent motion of the baskets permits if desired, a continuous feeding of the baskets, a continuous washing of the solids within the baskets with fresh solvent or enriched miscella as the case may be, a continuous withdrawal of filtered miscella from the extraction apparatus and a continuous withdrawal of extracted solids from the receiving hopper (not shown) of the extraction apparatus. One of the specific advantages of the intermittent movement of the baskets of the apparatus may be illustrated by the filling of a basket with solids to be extracted. A basket to be filled is moved to the "Fill" position so that the basket is centrally located under the fill spout which continuously drops solid to be extracted into said basket thereby building up a uniform bed. Since the basket is stationary for three-fourths of the fill time, and moved along the rail members 31 only one-fourth of the fill time, there is little opportunity for the basket to become unevenly filled or stratifying the fines which would result on loading the basket if it were continuously in motion under the fill spout.

Again, because of the intermittent linear motion of the baskets within the apparatus of this invention, each individual basket is intended to be centered under the miscella or solvent inlet at the "Solvent" position for three-fourths of its time at said location. If channeling of miscella were to occur within any basket, said channeling would most probably occur when the miscella flows down the side walls of the basket. Because each basket is centered under the miscella inlet at said "Solvent" position flow for three-fourths of its time, the probability of this channeling is negligible.

As will be apparent to one skilled in the art, the extractor apparatus of the present invention, which does not require chains, interconnecting links, and formed sections connecting the baskets together, lends itself to simpler and more economical fabrication.

And, as will be further realized by the skilled artisan there is no practical maximum limit to the depth of baskets that may be utilized. Since extraction efficiencies within a basket extractor increase to a degree with the depth of the bed of material being extracted, depending upon the specific nature of the material, the baskets for the apparatus of this invention may be fabricated to a depth for efficient extraction of said material independent of any other consideration.

Still another advantage of the apparatus of this invention concerns the use of multiple units for increasing the capacity of a previously installed extraction plant. When existent plants are forced to increase production capacity for one reason or another heretofore, either the existent extractor is replaced with a larger one, or an additional complete extractor is built beside the existent extractor to be operated in parallel. In many instances, this requires the construction of extractors at the site of the plant and requires parallel piping and conveying. With the apparatus of this invention a second unit may simply be installed above an existent unit in such a position that the dumping basket of the top unit is over the fill basket of the lower unit and operated in series rather than parallel, thus the control problems are not duplicated by parallel operation.

As is well known, in basket extractors heretofore used and which operate in substantially a horizontal plane as the instant apparatus, the miscella compartments beneath the basket have to be of a length considerably longer than the width of the basket, since the basket is in constant motion, and the miscella draining from said basket is required to drain over a larger period of time. However, in the present extractor apparatus, because of the aforesaid intermittent motion of the baskets along the linear extraction path, a miscella inlet may be positioned if so desired over any basket such as is shown at any of the "Wash" positions, so that as said miscella drains into the underlying drainage tank compartments as the basket is moved, it is then directed in a countercurrent direction to the next succeeding position along said path without dilution. This then permits the obtaining of a greater number of wash cycles within the apparatus of this invention with a minimum number of baskets than in other apparatus heretofore known or used.

Having thus described in detail the method and apparatus of the present invention for practicing the said method, it will be realized that the same are susceptible to various changes, modifications and arrangements of elements without departing from the inventive concepts thereof as are defined in the appending claim.

What is claimed is:

A solvent extractor comprising, a fluid retaining housing, track members extending generally horizontally through said housing and having first, second, third and fourth linear path segments, the track members of each segment connecting with the track members of the next previous segment and extending outwardly at approximately a right angle thereto to define a closed extraction path generally rectangular in configuration, a plurality of separate material containers, means for advancing each of said containers separately and in tandem along the track members of each path segment and including means for transferring each of said containers between each path segment, means for directing a charge of extract bearing material and solvent material simultaneously into one of said containers and defining a fill position along said first path segment, a group of separate fluid retaining tanks formed in said housing underlying the containers in said extraction path, a fluid circulation system in communication with each of said tanks being operable to transmit solvent and extract bearing material therebetween, a first tank of said group in said first path segment defining a first drain position spaced from said fill position in the direction of container travel whereat as said one container is moved to said drain position, a solvent and extract bearing solution drains from said one container into said first tank, a second tank of said group in said first path segment spaced from said first drain position in the direction of container travel to define a filter position whereat solvent and extract bearing solution drains into said second tank as said one container is moved to said filter position, said circulation system including means operable to remove the solvent and extract bearing solution from said first tank and reinsert it into said one container as said container is moved to said filter position, and said circulation system including means operable to withdraw the solvent and extract bearing solution from said second tank for discharge from said housing, said second tank underlying additional portions of said first and second path segments to define an additional drain position thereat to permit solvent and extract bearing solution to drain into said second tank as said one container is moved to and along said second path segment, first, second, third and fourth tanks of said group disposed in tandem along said third path segment and defining corresponding separate first, second and third wash positions and a solvent position, said circulation system including means operable as said one container is moved successively to each of said wash positions to direct solvent and extract bearing solution in a counterflow direction relative to the container travel into said one container from the tank defining the next succeeding position along said third path segment whereby to wash said extract bearing material and provide additional solvent and extract bearing solution to drain into said underlying tanks at said wash positions, and said circulation system including means for directing solvent and extract bearing solutions from one of said tanks in said third path segment to the container then located at said fill position, means in said circulation system for directing fresh solvent into said one container as it is moved to said solvent position effective to remove any soluble material then remaining in said extract bearing material, said fourth tank underlying additional portions of said third and fourth path segments to define an additional drain position therealong to permit solvent and extract bearing solution to drain into said fourth tank as said one container is moved along said third and fourth path segments, and a third tank of said group in said first path segment spaced between said fill position and said fourth tank to define a dump position whereat the insoluble residue is removed from said one container preparatory to its being moved to said fill position.

References Cited in the file of this patent

UNITED STATES PATENTS

| | | |
|---|---|---|
| 1,326,949 | Meehan | Jan. 6, 1920 |
| 1,411,154 | Bollman | Mar. 28, 1922 |
| 1,738,039 | Cope et al. | Dec. 3, 1929 |
| 2,327,438 | Kuhn | Aug. 24, 1943 |
| 2,811,539 | Karnofsky | Oct. 29, 1957 |